May 13, 1952 L. R. BRUHL 2,596,836
GLARE SHIELD
Filed Sept. 27, 1950

INVENTOR.
Louis R. Bruhl by: Gary Desmond & Parker
attys.

Patented May 13, 1952

2,596,836

UNITED STATES PATENT OFFICE 2,596,836

GLARE SHIELD

Louis R. Bruhl, Chicago, Ill.

Application September 27, 1950, Serial No. 187,029

2 Claims. (Cl. 160—362)

This invention relates to glare shields, and is more particularly concerned with the provision of a shield adapted to be positioned within an automobile adjacent the upper surface of the instrument panel to intercept sun rays passing through the windshield.

This invention further contemplates the provision of a glare shield embodying a strip of flexible material, such as cloth, adapted to be supported at its ends upon brackets secured to the side frames of an automobile windshield, the shield being detachably connected to the brackets and adapted to be folded into a relatively small package for storage in the glove compartment.

This invention further contemplates the provision of mounting brackets provided with hook members for detachable engagement with the ends of the shield, the hook members being pivotally adjustable on their respective brackets to vary the angular position of the shield relative to the windshield frame in order that the shield may be located flat against the flat upper surface disposed between the windshield and the upper end of the instrument panel.

This invention further contemplates the provision of a glare shield embodying a strip of vision flexible material, such as cloth, provided along its side edegs with elastic members which are secured at their ends to yokes.

This invention further contemplates the provision of a glare shield which is adapted to be adjusted to intercept sun rays passing either directly through a windshield or reflected from a flat surface usually provided on cars between the lower end of the windshield and the upper end of the instrument panel.

This invention further contemplates the provision of a glare shield which is relatively simple and inexpensive in construction, which may readily be installed for use on automobiles, and which does not obstruct the vision of the driver.

This invention embodies other novel features, details of construction and arrangement of parts which are hereinafter set forth in the specification and claims, and illustrated in the accompanying drawing, wherein:

Figure 1:
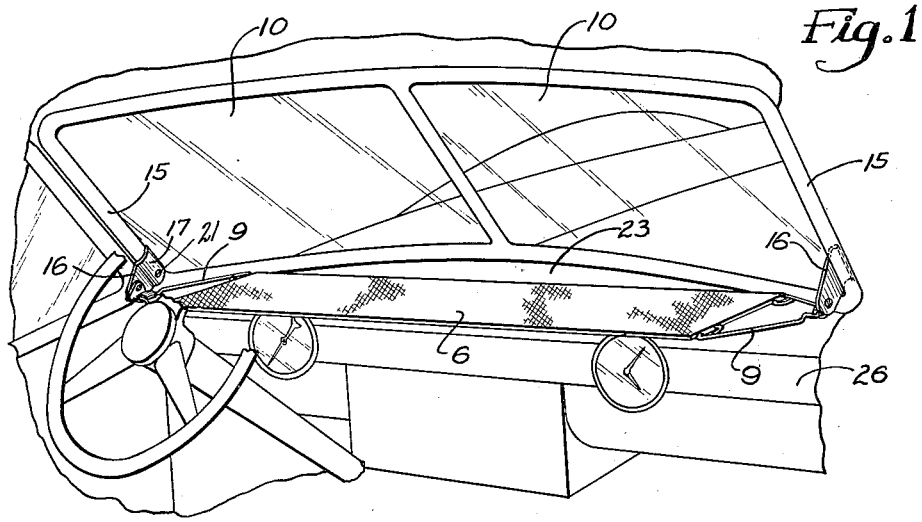
Fig. 1 is a fragmentary perspective view illustrating the manner in which the glare shield is mounted within an automobile.
Figure 2:
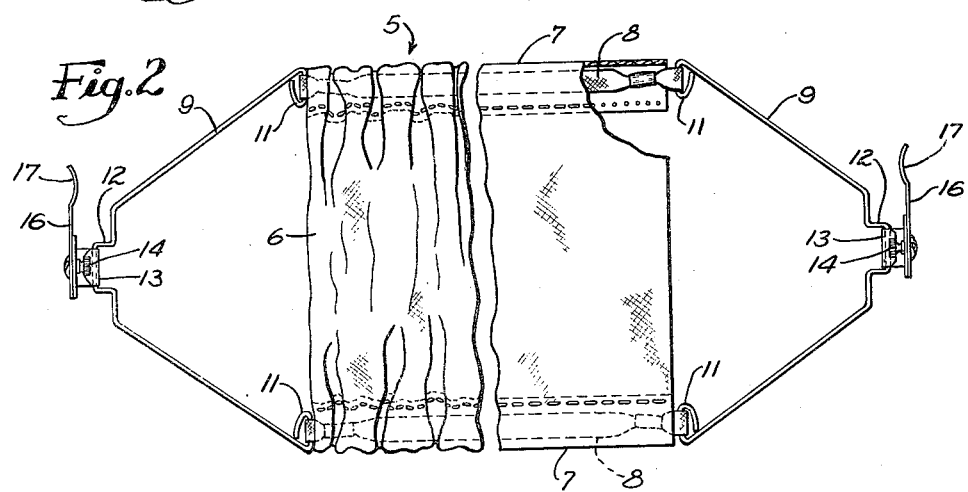
Fig. 2 is a broken plan view illustrating the glare shield.
Figure 3:
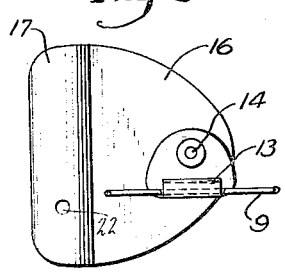
Fig. 3 is a plan view illustrating the mounting bracket.
Figure 4:
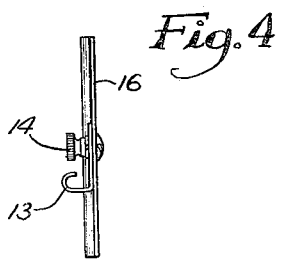
Fig. 4 is a side elevational view of same.

Referring now to the drawing for a better understanding of this invention, the glare shield structure for automobiles is shown as comprising a shield 5 embodying a rectangular-shaped piece of flexible material 6, such as cloth, formed with hems 7—7 along its side edges to receive a pair of elastic members 8—8. The cloth 6 is preferably of a dark color to absorb the heat from sun rays and to prevent reflection of the rays from its surface. The elastic members 8—8 may be in the form of strips of rubber, strips of cloth and rubber, or helical wire springs.

Yokes 9—9 are provided at the ends of the shield 5 to engage the ends of the elastic members 8—8. As illustrated in the drawing, the yokes are preferably formed from lengths of stiff wire bent at their ends to provide eyes 11—11 to receive the ends of the elastic members, the medial portion of each yoke being offset at 12. The eye portions 11—11 of the yokes are also preferably secured to the adjacent portions of the cloth 6 by metal fasteners, stitching, or other suitable means.

The medial offset portions 12—12 of the yokes 9—9 are detachably mounted upon hooks 13—13 supported for pivotal adjustment on screws 14—14 engaged to brackets 16—16. The hooks and brackets are adapted to be inexpensively blanked and formed from sheet metal and secured to the side frame members 15 of windshields 10 on opposite sides of an automobile to support the shield 5. In the preferred form of construction, each bracket is formed arcuate at its upper end at 17 to conform to the contour of the side frame members 15 of the windshields 10. In mounting a bracket 16 in place, it is only necessary to remove a screw 21 from the side frame member 15, place the upper end 17 of the bracket against the member 15, and then replace the screw to secure the bracket in fixed position. As each bracket is formed with an aperture 22 to receive the frame screw 21, it will be noted that the brackets may readily be permanently secured in position without the use of special tools.

After a pair of brackets 16—16 have been installed on an automobile, the glare shield 5 may be stretched lengthwise and supported at its ends, whenever desired, by merely engaging the medial portions 12—12 of the yokes 9—9 on the hooks 13—13. It will be noted that the glare shield 5 is then adapted to be adjusted to a predetermined angular position with respect to the horizontally disposed plate 23 disposed between the lower end of the windshield 10 and the upper end of the instrument panel 26 by merely pivotally adjusting the hooks 13—13 to the desired portions on the brackets 16—16. The normal length of the shield 15 is substantially less than its extended length when mounted upon the hooks 13—13. When not in use, the shield is adapted to be folded into a relatively small package suitable for storage in a glove compartment.

While this invention has been shown in but one form, it is obvious to those skilled in the art that it is not so limited but is susceptible of various changes and modifications without departing from the spirit and scope of the claimed invention.

I claim as my invention:

1. In a glare shield, a sheet of flexible material of greater length than width, elastic members mounted along the side edges of said sheet, a pair of yokes disposed at opposite ends of said sheet and having their ends connected to the ends of said elastic members, said yokes being disposed in substantially the same plane as said sheet, a pair of pivot elements having hook portions engaging the medial portions of the respective yokes, a pair of brackets securable in spaced relation adjacent the instrument panel of an automobile, and means for pivotally mounting said elements on the respective brackets to rotate said sheet about its longitudinal axis.

2. In a glare shield, a sheet of flexible material of greater length than width, elastic members mounted along the side edges of said sheet, a pair of generally V-shape yokes disposed at opposite ends of said sheet and having their ends connected to the ends of said elastic members, said V-shaped yokes being disposed in substantially the same plane as said sheet, a pair of pivot elements having hook portions detachably connected to the medial portions of the respective yokes, said hook portions being disposed in substantially the same plane as said yokes, a pair of brackets securable in spaced relation adjacent the instrument panel of an automobile, and bolts for pivotally mounting said elements on the respective brackets to rotate said sheet about its longitudinal axis.

LOUIS R. BRUHL.

REFERENCES CITED

The following references are of record in the file of this patent:

UNITED STATES PATENTS

| Number | Name | Date |
|---|---|---|
| 1,732,447 | Crane | Oct. 22, 1929 |
| 2,503,849 | Smith | Apr. 11, 1950 |